United States Patent
Tsuyuguchi et al.

(10) Patent No.: US 8,547,210 B2
(45) Date of Patent: Oct. 1, 2013

(54) SHIFT STAGE DISPLAY DEVICE

(75) Inventors: Makoto Tsuyuguchi, Wako (JP); Toru Takeda, Wako (JP); Naoki Murasawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 13/029,983

(22) Filed: Feb. 17, 2011

(65) Prior Publication Data

US 2011/0205039 A1 Aug. 25, 2011

(30) Foreign Application Priority Data

Feb. 23, 2010 (JP) ................................ 2010-037228

(51) Int. Cl.
*B60Q 1/00* (2006.01)
*B60K 1/00* (2006.01)
*F16H 61/16* (2006.01)

(52) U.S. Cl.
USPC ..................... 340/425.5; 180/292; 477/125

(58) Field of Classification Search
USPC ....................................................... 340/425
See application file for complete search history.

(56) References Cited

U.S. PATENT DOCUMENTS

| 4,981,052 | A | * | 1/1991 | Gierer ........................... 477/125 |
| 5,265,468 | A | * | 11/1993 | Holst et al. ................. 73/115.01 |
| 6,935,204 | B2 | * | 8/2005 | Walker et al. .................... 74/335 |
| 2009/0299590 | A1 | * | 12/2009 | Nedachi et al. ................. 701/68 |

FOREIGN PATENT DOCUMENTS

| JP | 2000-097337 | | 4/2000 |
| JP | 2000-097337 | A | 4/2000 |
| JP | 2000097337 | A * | 4/2000 |

* cited by examiner

*Primary Examiner* — Jennifer Mehmood
*Assistant Examiner* — Omar Casillashernandez
(74) *Attorney, Agent, or Firm* — Squire Sanders (US) LLP

(57) ABSTRACT

The shift position display device includes a control section configured to automatically shift a shift position by operating actuators based on a shift change command. A gear position display section is configured to display a condition of an automatic transmission based on the display command of the control section. A failure detection unit is configured to detect a failure of the automatic transmission. The control section is configured to switch display of the gear position display section from a lighting display of a numerical figure to a display for failure occurrence notification. The control section is also configured to determine whether the failure is a failure in which traveling is possible or a failure in which traveling is possible when a predetermined limitation is met. The control section is also configured to switch from the display for failure occurrence notification to a shift position.

16 Claims, 10 Drawing Sheets

(FLICKERING OF LATERAL BAR (BAR))

(FLICKERING OF NUMERICAL FIGURE "1")

(FLICKERING OF NUMERICAL FIGURE "3")

SHIFT STAGE DISPLAY DEVICE

BACKGROUND

1. Field

The present invention relates to a shift position display device, and relates specifically to a shift position display device displaying the present shift position of an automatic transmission arranged in a vehicle.

2. Description of the Related Art

A shift position display device arranged in a meter device and the like of a vehicle and displaying the shift position of an automatic transmission selected at present by a numerical figure, such as 1-6, has been known.

In Patent Literature 1 (JP-A No. 2000-97337), a shift position display device is disclosed which allows to light off the display of the shift position or to perform the display other than the numerical figure showing the shift position according to the kind of a failure when a failure occurs in the automatic transmission.

However, although the shift position display device described in the Patent Literature 1 could make an occupant recognize that a failure had occurred in an automatic transmission, it could not make the occupant recognize information more discriminatingly, for example, that the vehicle could not travel due to the failure, or that the vehicle could travel under a predetermined condition although the failure had occurred.

SUMMARY

An object of the present invention is to provide a shift position display device capable of addressing the problems of the related art described above and capable of making the occupant recognize the condition of the vehicle when a failure occurs in an automatic transmission.

In order to achieve the object, the first feature of the present invention exists in a shift position display device, including a control section configured to automatically shift a shift position by operating actuators based on a shift change command. A gear position display section can display a condition of an automatic transmission based on the display command of the control section. A Failure detection unit can detect a failure of the automatic transmission. The control section is configured to switch display of the gear position display section from a lighting display of a numerical figure showing the shift position selected at present to a display for failure occurrence notification if the failure of the automatic transmission is detected while power supply of a vehicle is turned on. The control section is also configured to determine whether the failure is a failure in which traveling is possible or a failure in which traveling is possible when a predetermined limitation is placed on shifting operation of the automatic transmission if the failure is detected when the power supply of the vehicle is switched from OFF to ON, and to switch from the display for failure occurrence notification to a shift position display for the time of a failure if the failure is determined to be the failure in which traveling is possible when the predetermined limitation is placed on the shifting operation.

A second feature exists in that the display for failure occurrence notification is a bar flickering display making one lateral bar flicker. The shift position display for the time of a failure is a flickering display of the numerical figure showing the shift position selected at present.

A third feature exists in that the failure detection means is constructed so as to detect a failure of a gear position sensor detecting the shift position selected at present. The control section is constructed so as to determine that a shift drum is turned to a neutral position if the shift drum is detected to be in a predetermined neutral position by a neutral switch and a main shaft is determined to be rotating together with a crankshaft by output of an engine speed sensor and main shaft revolving speed sensors, and to permit traveling with a predetermined limitation being placed on the shifting operation when the failure of the gear position sensor is detected.

A fourth feature exists in that, when the failure of the gear position sensor is detected, and if the shift drum is detected not to be in a predetermined neutral position by the neutral switch and a main shaft is determined to be stopped based on output of the main shaft revolving speed sensors, the control section determines that the shift drum is turned to a first-speed gear position and shifts from the display for failure occurrence notification to the shift position display for the time of the failure.

A fifth feature exists in that the automatic transmission is constructed so as to control engagement/disengagement of oil-hydraulic clutches by passing and stopping constant oil pressure supplied from an oil-hydraulic pump by valves, the failure detection means is constructed so as to detect a failure of a line oil pressure sensor detecting the constant oil pressure supplied from the oil-hydraulic pump, and the control section is constructed so as to permit traveling with the predetermined limitation being placed on the shifting operation by substituting sensor output of clutch oil pressure sensors detecting the supply oil pressure to the oil-hydraulic clutches when a failure of the line oil pressure sensor is detected.

A sixth feature exists in that the automatic transmission is a twin-clutch type transmission controlling engagement/disengagement of a first clutch and a second clutch respectively by passing and stopping the constant oil pressure supplied from an oil-hydraulic pump by a first valve or a second valve. The failure detection means is constructed so as to detect failures of the first clutch oil pressure sensor detecting supply oil pressure to the first clutch and the second clutch oil pressure sensor detecting supply oil pressure to the second clutch. The control section is constructed so as to permit traveling with the second clutch only being operated when the failure of the first clutch oil pressure sensor is detected whereas to permit traveling with the first clutch only being operated when the failure of the second clutch oil pressure sensor is detected.

A seventh feature exists in that the gear position display section is constructed of a 7-segment display.

According to the first feature, the failure detection section detecting the failure of the automatic transmission is provided. The control section is constructed so as to switch display of the gear position display section from lighting display of a numerical figure showing a shift position selected at present to display for failure occurrence notification if the failure of the automatic transmission is detected while the power supply of the vehicle is turned on. The control section is also constructed to determine whether the failure is a failure in which traveling is possible or a failure in which traveling is possible when a predetermined limitation is placed on shifting operation of the automatic transmission if the failure is detected when the power supply of the vehicle is switched from OFF to ON and to switch from the display for failure occurrence notification to a shift position display for the time of a failure if the failure is determined to be the failure in which traveling is possible when the predetermined limitation is placed on shifting operation. Therefore, when a failure occurs during traveling, it becomes possible to make an occupant quickly recognize that the failure has occurred. Also, when the power supply is reset (power supply OFF→again ON) in a state a failure occurred, the occupant is presumed to have recognized the failure already, and if traveling is possible by limiting the traveling condition, the control section switches to the shift position display for the time of a failure, and can make the occupant recognize that traveling is possible under a limited condition although some failure has occurred. Thus, both of quick recognition of a failure during traveling and ease of recognition of the vehicle condition thereafter can be ensured compatibly.

According to the second feature, the display for failure occurrence notification is a bar flickering display making one lateral bar flicker. The shift position display at the time of a failure is a flickering display of a numerical figure showing a shift position selected at present, and therefore, when a failure occurs during traveling, the shift position numerical figure is switched to bar flickering and occurrence of the failure itself can be quickly recognized. Therefore, when the power supply is reset, it becomes possible to recognize with which speed gear traveling is possible.

According to the third feature, the failure detection means is constructed so as to detect a failure of the gear position sensor detecting a shift position selected at present. The control section is constructed so as to determine that the shift drum has been turned to the neutral position if the shift drum is detected to be in a predetermined neutral position by the neutral switch and the main shaft is determined to be rotated together with the crankshaft by output of the engine speed sensor and the main shaft revolving speed sensors, and to permit traveling with a predetermined limitation being placed on the shifting operation when the failure of the gear position sensor is detected. Therefore, by using output of the engine speed sensor and the main shaft revolving speed sensors, even when the gear position sensor fails, recognition that the shift drum is in the neutral position can be ensured.

According to the fourth feature, when a failure of the gear position sensor is detected, and if the shift drum is detected not to be in the predetermined neutral position by the neutral switch and the main shaft is determined to be stopped based on output of the main shaft revolving speed sensors, the control section determines that the shift drum is turned to the first-speed gear position and shifts from the display for failure occurrence notification to the shift position display for the time of a failure. Therefore, by using output of the engine speed sensor and the main shaft revolving speed sensors, even when the gear position sensor fails, it becomes possible to presume and detect that the shift drum is in the first-speed gear position.

According to the fifth feature, the automatic transmission is constructed so as to control engagement/disengagement of the oil-hydraulic clutches by passing and stopping constant oil pressure supplied from the oil-hydraulic pump by the valves. The failure detection means is constructed so as to detect a failure of the line oil pressure sensor detecting constant oil pressure supplied from the oil-hydraulic pump. The control section is constructed so as to permit traveling with a predetermined limitation being placed on the shifting operation by substituting sensor output of the clutch oil pressure sensors detecting the supply oil pressure to the oil-hydraulic clutches when a failure of the line oil pressure sensor is detected. Therefore, even when a failure occurs in the line oil pressure sensor, traveling becomes possible using the output information of the sensor detecting the oil pressure actually supplied to the oil-hydraulic clutches.

According to the sixth feature, the automatic transmission is a twin-clutch type transmission controlling engagement/disengagement of the first clutch and the second clutch respectively by passing and stopping constant oil pressure supplied from the oil-hydraulic pump by the first valve or the second valve. The failure detection means is constructed so as to detect failures of the first clutch oil pressure sensor detecting the supply oil pressure to the first clutch and the second clutch oil pressure sensor detecting the supply oil pressure to the second clutch. The control section is constructed so as to permit traveling with the second clutch only being operated when a failure of the first clutch oil pressure sensor is detected whereas to permit traveling with the first clutch only being operated when a failure of the second clutch oil pressure sensor is detected. Therefore, in the twin-clutch type transmission, even when a failure in which the clutch oil pressure on one side cannot be detected occurs, traveling becomes possible using the clutch on the other side.

According to the seventh feature, the gear position display section is constructed of a 7-segment display, and therefore it becomes possible to discriminatingly display the display for failure occurrence notification allowing recognition of occurrence of the failure and shift position display for the time of a failure allowing recognition of whether traveling is possible or not.

DESCRIPTION OF PREFERRED EMBODIMENTS

Figure 1:
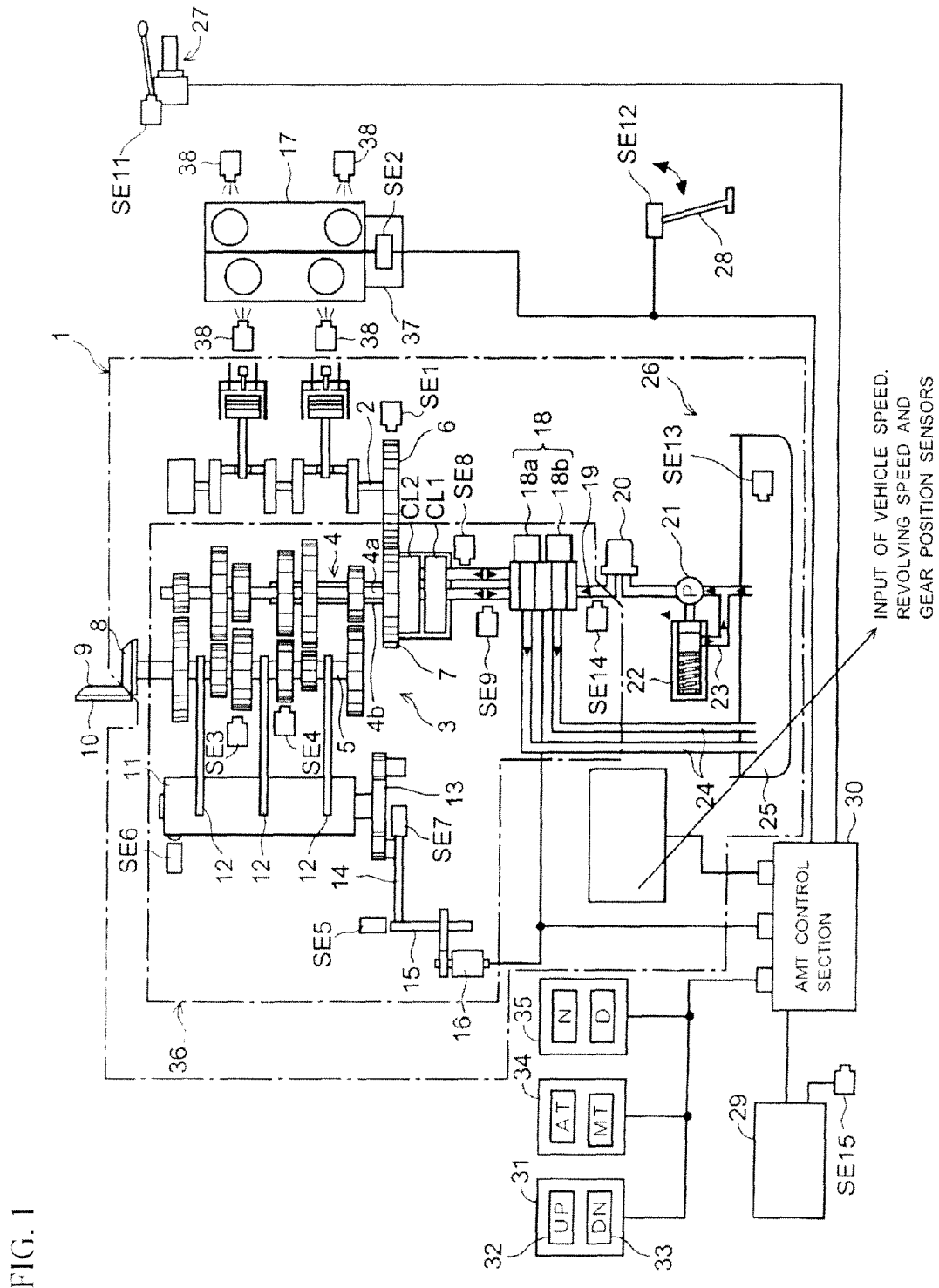
FIG. 1 is a system construction drawing of an AMT and its peripheral devices in relation with an embodiment of the present invention.
Figure 2:
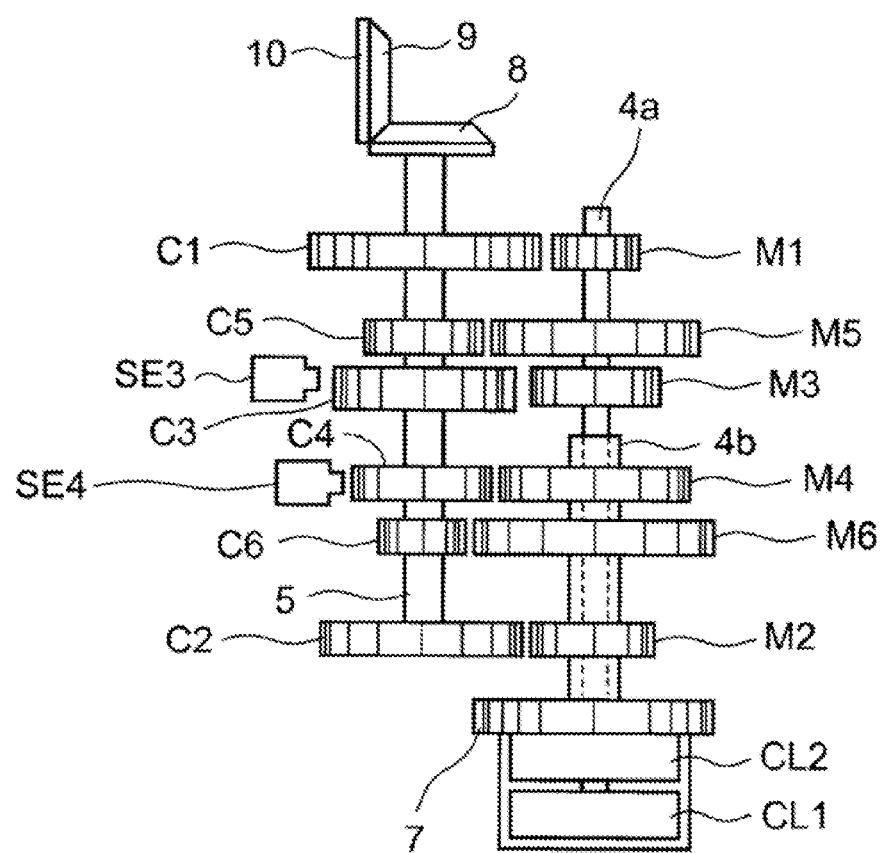
FIG. 2 is an arrangement relational drawing showing the meshing relation of the shifting gears.

Below, preferred embodiments of the present invention will be described in detail referring to drawings. FIG. 1 is a system construction drawing of an example of an automated manual transmission (hereinafter referred to as an "AMT") 36 as an automatic transmission applied to a motorcycle and its peripheral devices. FIG. 2 is an arrangement relational drawing showing the meshing relation of respective shafts and shifting gears in the AMT 36. The AMT 36 is, in this example, a twin-clutch type transmission device engaging/disengaging rotational power of an engine 1 by two clutches disposed on a main spindle or main shaft. The AMT 36 connected to the engine 1 is drive-controlled by an oil-hydraulic system for clutch 26 and an AMT control unit 30 as a shift control device. The engine 1 can include a throttle body 17 of a throttle-by-wire type, and a motor 37 for opening/closing a throttle valve is provided in the throttle body 17. Injectors 38 of a fuel injection device are arranged for respective cylinders in the vicinity of the throttle body 17.

The AMT 36 can include a forward six-speed transmission 3, a first clutch CL1, a second clutch CL2, a shift drum 11, and a shift control motor 16 turning the shift drum 11. Many gears constructing the transmission 3 are joined or loosely fitted to a main shaft 4 and a counter shaft 5 respectively. The main shaft 4 is composed of an inner main shaft 4a and an outer main shaft 4b, the inner main shaft 4a is joined with the first clutch CL1, and the outer main shaft 4b is joined with the second clutch CL2. The main shaft 4 and the counter shaft 5 are provided with the shifting gears displaceable in the axial direction of the main shaft 4 and the counter shaft 5 respectively, and ends of shift forks 12 are engaged with guide grooves (not shown) shaped in these shifting gears and the shift drum 11 respectively.

A primary driving gear 6 is joined to an output shaft, for example a crankshaft 2, of the engine 1, and the primary driving gear 6 is meshed with a primary driven gear 7. The primary driven gear 7 is connected to the inner main shaft 4a through the first clutch CL1 and is connected to the outer main shaft 4b through the second clutch CL2. Also, the AMT 36 includes an inner main shaft revolving speed sensor SE3 and an outer main shaft revolving speed sensor SE4 detecting the revolving speed of the inner main shaft 4a and the outer main shaft 4b respectively by measuring the rotational speed of predetermined shifting gears on the counter shaft 5.

A ring gear 8 is joined to an end of the counter shaft 5, and a pinion gear 9 fixed to an end of a drive shaft 10 engages with the ring gear 8. The drive shaft 10 transmits rotational power to a rear wheel (not shown) as a driving wheel.

The AMT 36 is provided with an engine speed sensor SE1 opposingly arranged in the outer periphery of the primary driven gear 7, a gear position sensor SE7 detecting the gear position at present based on the rotational position of the shift drum 11, a spindle sensor SE5 detecting the turning position of a spindle 15 of a reduction gear in order to detect the rotational amount of the shift control motor 16, and a neutral switch SE6 detecting that the shift drum 11 is in the neutral position. Rotational power of the shift control motor 16 is transmitted to a gear shift rod 14 turning a shift drum gear 13 through the spindle 15.

The throttle body 17 is provided with a throttle opening sensor SE2 detecting the opening of a throttle valve. Also, the AMT control unit 30 is inputted with information from a throttle grip opening sensor SE11 detecting the manipulated variable of a throttle mechanism 27 disposed in a steering handlebar and the like and a side stand switch SE12 detecting the storing condition of a side stand 28. The AMT control unit 30 can display vehicle information based on a variety of sensor information in addition to the engine speed, vehicle speed and the like on a meter device 29. Further, the meter device 29 is inputted with information from a parking brake switch SE15 detecting the working condition of a parking brake used in parking.

The oil-hydraulic system for clutch 26 is constructed to be used for both lubricating oil for the engine 1 and hydraulic fluid driving a clutch CL compatibly. The oil-hydraulic system for clutch 26 is equipped with an oil tank 25 and a pipe line 19 for feeding the oil (hydraulic fluid) inside the oil tank 25 to the first clutch CL1 and the second clutch CL2. An oil temperature sensor SE13 is arranged inside the oil tank 25. A line oil pressure sensor SE14, an oil filter 20, an oil-hydraulic pump 21 as an oil-hydraulic supply source and a valve (electronic control valve) 18 as an electric actuator are arranged on the pipe line 19, and a regulator 22 for maintaining the oil pressure supplied to the valve 18 at a constant value is disposed on a return pipe line 23 connected to the pipe line 19. The valve 18 is constructed so as to be able to supply the oil pressure to the first clutch CL1 and the second clutch CL2 individually. Further, valves 18a, 18b are also provided with return pipe lines 24 for oil respectively.

A pipe line connecting the first valve 18a and the first clutch CL1 is provided with a first clutch oil pressure sensor SE8 measuring the oil pressure generated in the first clutch CL1. Similarly, a pipe line connecting the second valve 18b and the second clutch CL2 is provided with a second clutch oil pressure sensor SE9 measuring the oil pressure generated in the second clutch CL2.

The AMT control unit 30 is connected with a mode switch 34 switching between an automatic transmission (AT) mode and a manual transmission (MT) mode, a shift switch 31 composed of a shift-up switch 32 and a shift-down switch 33 commanding upshifting (UP) or downshifting (DN), and a neutral/drive changeover switch 35 switching between neutral (N) and drive (D). The AMT control unit 30 includes a central processing section (CPU), controls the valve 18 and the shift control motor 16 according to the output signal of respective sensors and switches described above, and can switch the gear position of the AMT 36 automatically or semi-automatically.

When the AT mode is selected, the AMT control unit 30 automatically switches a shift position according to the information on the vehicle speed, engine speed, throttle opening and the like, whereas when the MT mode is selected, it allows the transmission 3 to upshift or downshift with the operation of the shift switch 31. Also, even when the MT mode is selected, execution of auxiliary automatic shift control for preventing over-rotation and a stall of the engine is possible, and the over-rotation and the stall of the engine do not occur.

In the oil-hydraulic system for clutch 26, oil pressure is applied to the valve 18 by the oil-hydraulic pump 21, and the regulator 22 performs controlling so that the oil pressure does not exceed an upper limit. When the valve 18a or 18b is opened by the instructions from the AMT control unit 30, oil pressure is applied to the first clutch CL1 or the second clutch CL2, and the primary driven gear 7 is connected to the inner main shaft 4a or the outer main shaft 4b through the first clutch CL1 or the second clutch CL2. On the other hand, when the valve is closed and application of oil pressure is stopped, the first clutch CL1 and the second clutch CL2 are driven toward the direction to cut the connection with the inner main shaft 4a and the outer main shaft 4b by pressing force of a return spring (not shown).

With respect to the valve 18 driving the clutch by opening/closing the pipe line connecting the pipe line 19 and both clutches CL1 and CL2, the AMT control unit 30 can optionally change the time taken from the fully closed state to the fully opened state of the pipe line and the like based on the drive signal.

The shift control motor 16 turns the shift drum 11 according to the instructions from the AMT control unit 30. When the shift drum 11 turns, the shift forks 12 are displaced in the axial direction of the shift drum 11 according to the shape of the guide grooves formed in the outer periphery of the shift drum 11. Accompanying this, meshing of the gears on the counter shaft 5 and the main shaft 4 changes, and upshifting or downshifting of the transmission 3 is executed.

In the AMT 36 in relation with the present embodiment, the inner main shaft 4a connected to the first clutch CL1 is constructed so as to support odd-numbered position gears (1st, 3rd, 5th speed), and the outer main shaft 4b connected to the second clutch CL2 is constructed so as to support even-numbered position gears (2nd, 4th, 6th speed). Therefore, during traveling with the odd-numbered position gear for example, supply of oil pressure to the first clutch CL1 is continued, and the connection state is maintained. Also, when the shift change is to be performed, gear meshing is changed in advance by turning of the shift drum 11. That is, by execution of "preliminary shift change", the shift operation can be completed only by switching the connection state of both clutches.

FIG. 2 is an arrangement relational drawing showing the meshing relation of the shifting gears. The inner main shaft 4a connected to the first clutch CL1 supports driving gears M1, M3, M5 of the odd-numbered shift positions. The 1st speed driving gear M1 is formed integrally with the inner main shaft 4a. Also, the 3rd speed driving gear M3 is attached slidably in the axial direction and non-rotatably in the circumferential direction, and the 5th speed driving gear M5 is attached non-slidably in the axial direction and rotatably in the circumferential direction.

The outer main shaft 4b connected to the second clutch CL2 supports driving gears M2, M4, M6 of the even-numbered shift positions. The 2nd speed driving gear M2 is formed integrally with the outer main shaft 4b. Also, the 4th speed driving gear M4 is attached slidably in the axial direction and non-rotatably in the circumferential direction, and the 6th speed driving gear M6 is attached non-slidably in the axial direction and rotatably in the circumferential direction.

On the other hand, the counter shaft 5 supports driven gears C1-C6 that mesh with the driving gears M1-M6. The 1st speed to 4th speed driven gears C1-C4 are attached non-slidably in the axial direction and rotatably in the circumferential direction, and the 5th, 6th speed driven gears C5, C6 are attached slidably in the axial direction and non-rotatably in the circumferential direction. The shift forks 12 connect/disconnect dog clutches formed in respective gears by sliding the driving gears M3, M4 and the driven gears C5, C6, that is, the gears slidable in the axial direction, among the gear trains described above, by the shift forks 12.

When, for example, the 1st speed gear is selected, the AMT 36 transmits the rotational power of the engine transmitted from the crankshaft 2 to the primary driven gear 7 to the inner main shaft 4a by connection of the first clutch CL1, and transmits the rotational power from the 1st speed driving gear M1 to the counter shaft 5 through the 1st speed driven gear C1. At this time, the dog clutch for the 1st speed is meshed between the 1st speed driven gear C1 and the 5th speed driven gear C5.

Also, when the rotational power is transmitted by the 1st speed gear, the AMT 36 performs "preliminary shift change" preparing for the shift change to the 2nd speed by meshing the dog clutch for the 2nd speed, that is, the dog clutch between the 6th speed driven gear C6 and the 2nd speed driven gear C2. At this time, because the second clutch CL2 is cut off, the rotational power of the engine only makes the outer main shaft 4b idle through the 2nd speed driving gear M2 even if the dog clutch for the 2nd speed is meshed during traveling by the 1st speed gear. Further, when the connecting side clutch is switched from the first clutch CL1 to the second clutch CL2 after completion of the preliminary shift change, the rotational power is outputted through the 2nd speed gear instantaneously without interruption of the rotational power.

Also, in the shift drum 11, the positions of "neutrally waiting" where the group on the side not transmitting the rotational power out of the even-numbered gears group and the odd-numbered gears group are made the neutral state are set between respective predetermined turning positions for selecting respective shift steps. Therefore, the odd-numbered position gears can be made the neutral state during traveling with the even-numbered position gears, and the even-numbered position gears can be made the neutral state during traveling with the odd-numbered position gears.

Figure 3:
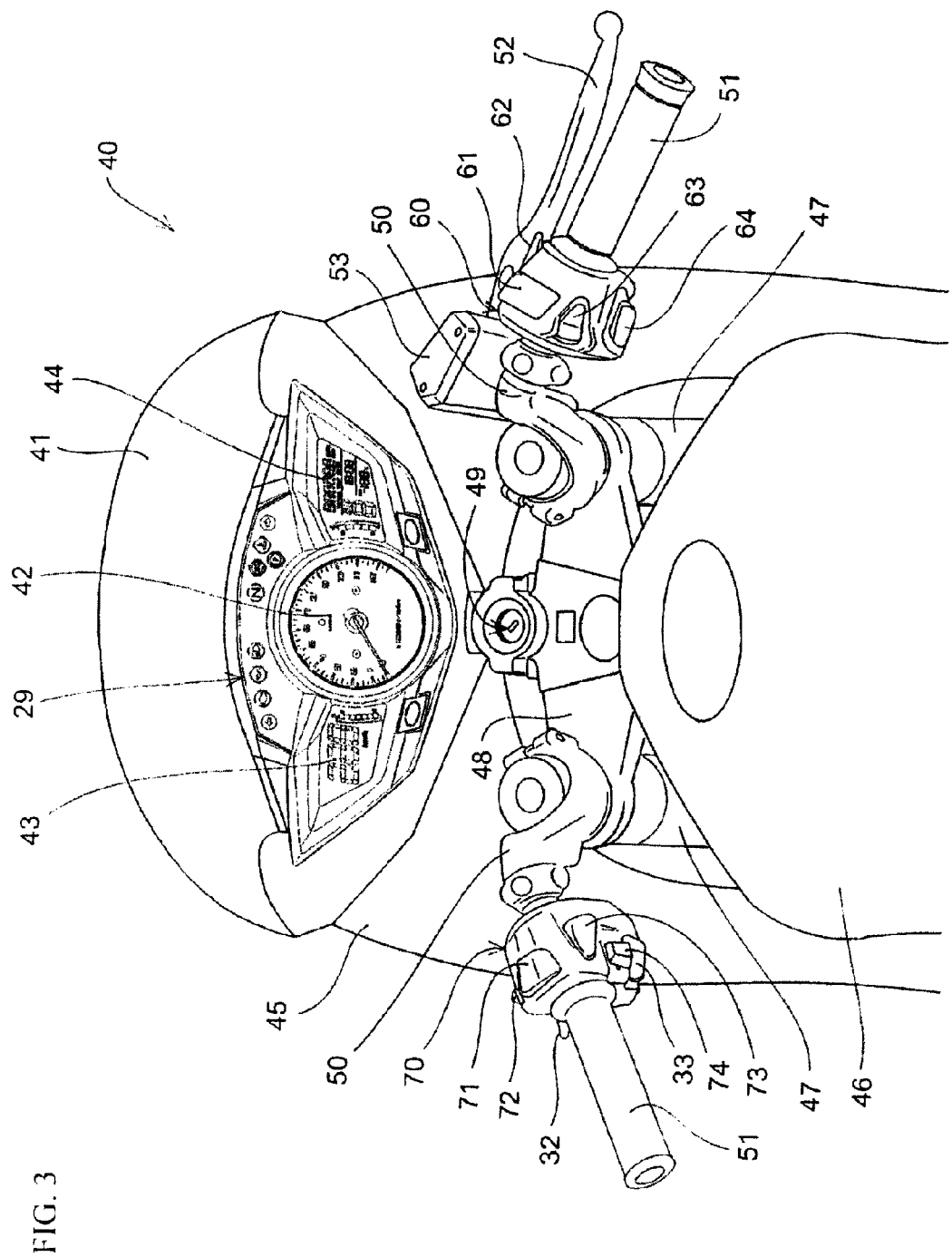
FIG. 3 is a partial enlarged view of a motorcycle.

FIG. 3 is a partial enlarged view of a motorcycle 40. This drawing is handlebars and their surroundings looked down from rear above the vehicle body, and shows generally same condition with the condition viewed by a rider seated on a seat. The vehicle front side of the steering handlebars 50 steering the front wheel (not shown) is covered with a cowling 45 as an exterior component. A windbreak screen 41 is attached to the upper end of the cowling 45, and the meter device 29 is disposed therebeneath having a tachometer 42, a left side liquid crystal panel 43 displaying the vehicle speed and the like, and a right side liquid crystal panel 44 provided with a distance meter and the like.

The front wheel of the motorcycle 40 is rotatably journaled to the lower ends of a pair of right and left front forks 47, and the upper parts of the front forks 47 are connected with and fixed by a top bridge 48 attached with a main switch 49. The top bridge 48 is rotatably attached to a vehicle body frame of the motorcycle 40 through a steering stem, and the steering handlebars 50 are fixed to the upper ends of the front forks 47. A fuel tank 46 is disposed between the top bridge 48 and a seat.

Handlebar grips 51 formed of cylindrical rubber and the like and held by an occupant are attached to bar parts of the right and left steering handlebars 50 respectively. A front wheel brake lever 52 is disposed on the vehicle front side of the right side handlebar grip 51, and a reservoir tank 53 storing hydraulic fluid for an oil-hydraulic brake system is attached to the base part of the front wheel brake lever 52. Also, the right side handlebar grip 51 is supported rotatably with respect to the handlebar, and is constructed so as to operate a throttle mechanism by the rotating operation.

A handlebar switch 60 provided with operation switches for a variety of electrical components is attached to the right side steering handlebar 50 in a part adjacent to the vehicle body center side of the handlebar grip 51. In the handlebar switch 60, an engine stop switch 61, a neutral/drive changeover switch 63, a starter switch 64 and a traveling mode changeover switch 62 are arranged.

The swinging pressing type (returning to the original position when pressing force is released) traveling mode changeover switch 62 attached on the vehicle body front side is operated with the pointing finger of the right hand of an operator being drawn forward (to the occupant's side), and switches the automatic traveling mode and the semi-automatic traveling mode for each operation. Also, the engine stop switch 61 is made a seesaw switch type maintaining one side or the other side position unless an operation force is applied, and brings the engine to an emergency stop by operation to OFF side during operation of the engine and thereby stopping the drive of an ignition device.

A seesaw pressing type, returning to the neutral position when pressing force is released, neutral/drive changeover switch 33 performs a switching operation of neutral (N) and the 1st speed (D) of the automatic transmission by pressing the D side in the left or the N side in the right while the motorcycle 40 stops. In the present embodiment, it is configured to be switched to a sports traveling mode (S mode)

giving more importance to the driving force than in an ordinary automatic traveling mode (D mode) when D side is further pressed while the automatic traveling mode is selected.

The pressing type starter switch 64 disposed in the lowermost part of the handlebar switch 60 is for starting the engine by operating it when an ignition switch is in the ON state and the transmission is in the neutral state.

On the other hand, to the left side steering handlebar 50, a handlebar switch 70 provided with operation switches for a variety of electrical components is attached in a part adjacent to the vehicle body center side of the handlebar grip 51. In the left side handlebar switch 70, a light axis changeover switch 71 for a head light, a horn switch 73, a turn indicator switch 74, a hazard lamp switch 72, an upshift switch 32 and a downshift switch 33 for performing shift operation of the automatic transmission are arranged.

Figure 4:
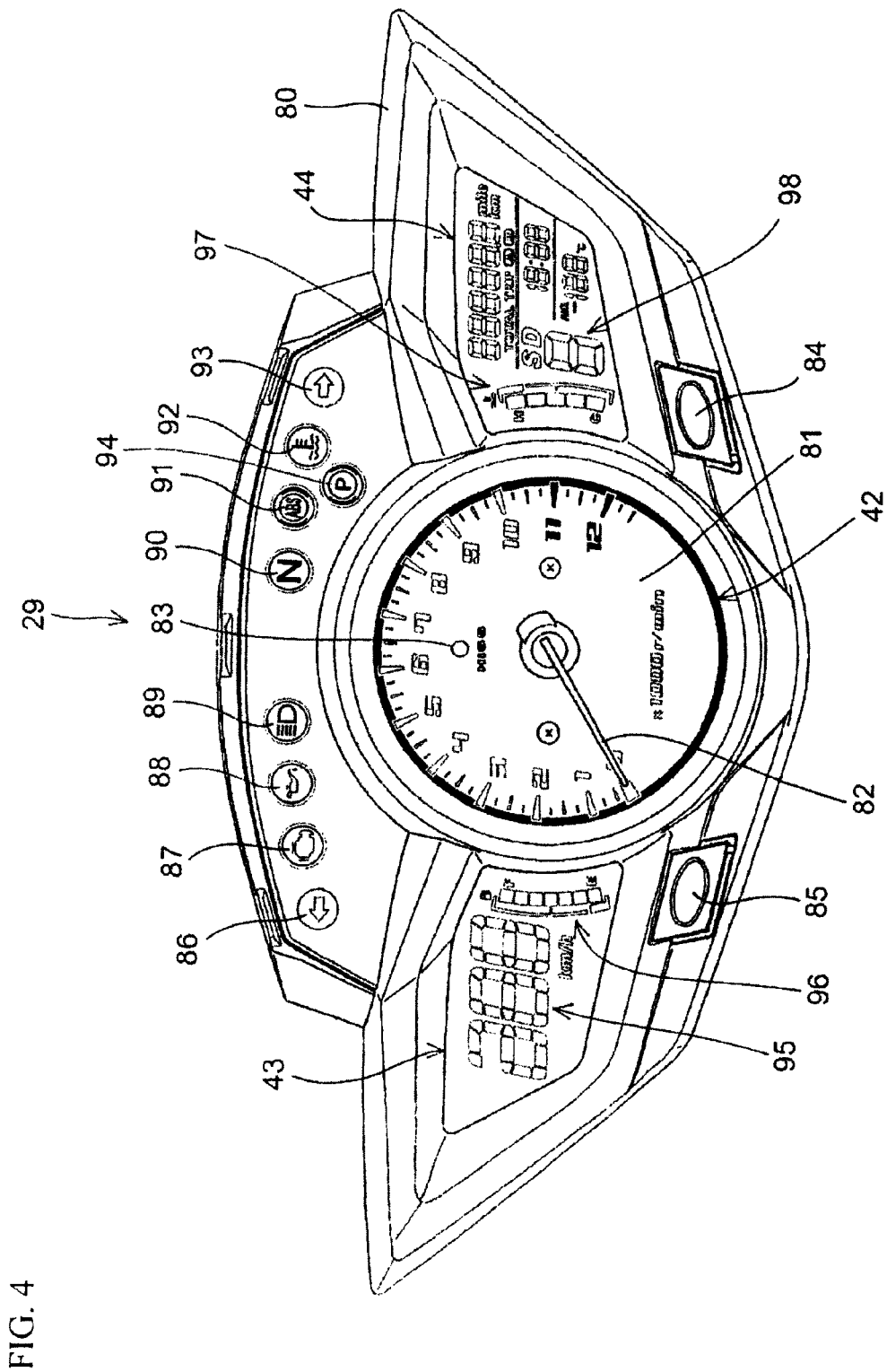
FIG. 4 is a front elevation of a meter device.

FIG. 4 is a front elevation of the meter device 29. The meter device 29 is constructed by disposing the left side liquid crystal panel 43, the engine revolution counter (tachometer) 42, the right side liquid crystal panel 44, and a variety of warning lamps in a housing 80 formed of a resin and the like. Operation switches 84, 85 for switching the display, resetting of the display, and the like of the liquid crystal panels are arranged beneath the left side liquid crystal panel 43 and the right side liquid crystal panel 44.

The left side liquid crystal panel 43 includes a speed meter showing an optional 3-digit numerical figure by a plurality of segments, and a fuel meter 96 showing the fuel remaining quantity by seven box-style segments continuously arranged in the vertical direction. The tachometer 42 is made an analog type pointing a numerical figure on a dial 81 with a pointer 82. An indicator 83 showing the working condition of a theft prevention device is disposed above a rotary shaft of the pointer 82.

Above the tachometer 42, disposed in the order from the left are, a left side turn indicator working lamp 86 flickering interlockingly with the left side turn indicator (direction indicating lamp), an engine warning lamp 87 lit when some failure occurs in the AMT and an engine system such as a fuel injection device and the like, an oil pressure warning lamp 88 lit when the oil pressure of the engine oil exceeds a predetermined value, a headlight high beam display lamp 89 lit when the headlight (a lamp lighting the front) is switched from the low beam (downward) to the high beam (upward), a neutral lamp 90 lit when the neutral state of the transmission is detected, an ABS warning lamp 91 lit when a failure occurs in an anti-lock brake system (ABS), a parking brake working lamp 94 lit when the parking brake switch SE15 detects working of the parking brake, a low water temperature warning lamp 92 lit when the cooling water temperature of the engine is a predetermined value or below, and a right side turn indicator working lamp 93 flickering interlockingly with the right side turn indicator. Also, on the right side liquid crystal panel 44 formed of a segment type display, a plurality of displaying functions is provided in addition to a water temperature meter 97 and a gear position display section 98. Here, reference is made to FIG. 5.

Figure 5:
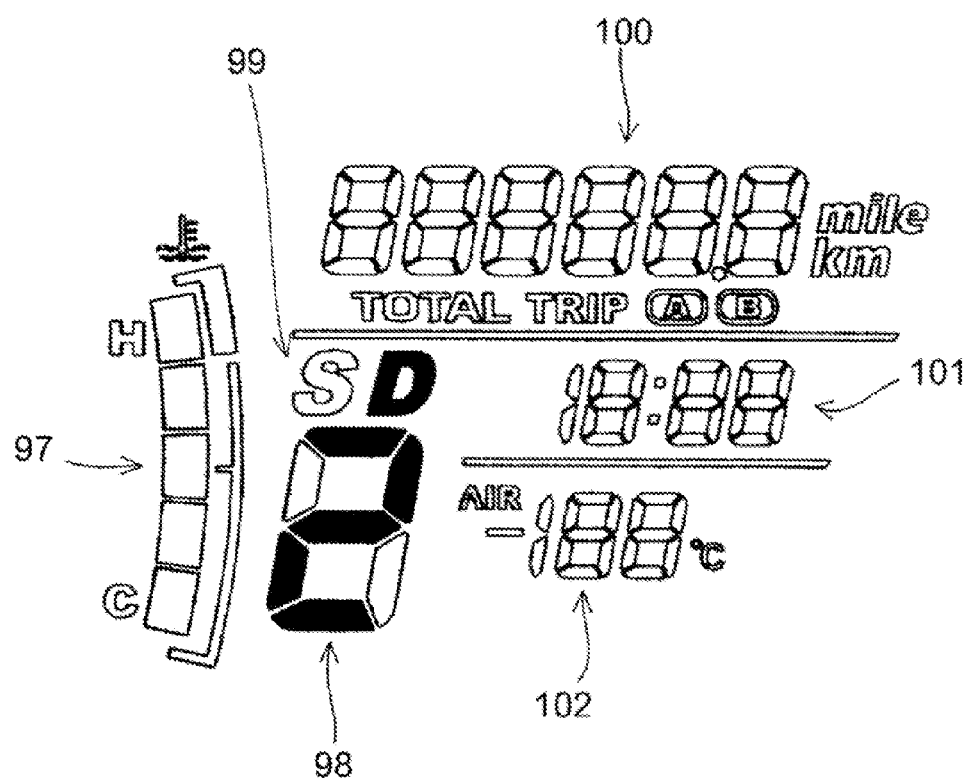
FIG. 5 is an enlarged view of a liquid crystal panel of the meter device.

FIG. 5 is an enlarged view of the liquid crystal panel 44. The water temperature meter 97 is constructed by arranging five box-shaped segments in the vertical direction. Also, the gear position display section 98 formed of 7-segment type display displays the shift position at present by a numerical figure of 1-6 during normal traveling. Above the gear position display section 98, a traveling mode display section 99 displaying which of the normal automatic traveling mode (D mode) and the sports traveling mode (S mode) has been selected in selecting the automatic traveling mode is arranged. Also, in the drawing, the state in which the 2nd speed gear is selected in the D mode is shown. Also, to the upside and the right of the traveling mode display section 99 and the gear position display section 98, a trip odometer 100, a clock 101 and an external air temperature meter 102 whose numerical figure sections are constructed of 7-segment type display are arranged.

The meter device 29 in relation with the present embodiment is featured that the display of the gear position display section 98 as a shift position display device is configured, when some failure occurs in the AMT 36, to be switched from the ordinary gear position display to the failure-time-dedicated display. Below, the method for displaying the gear position display when a failure is detected will be described referring to FIG. 6 to FIG. 13.

Figure 6:
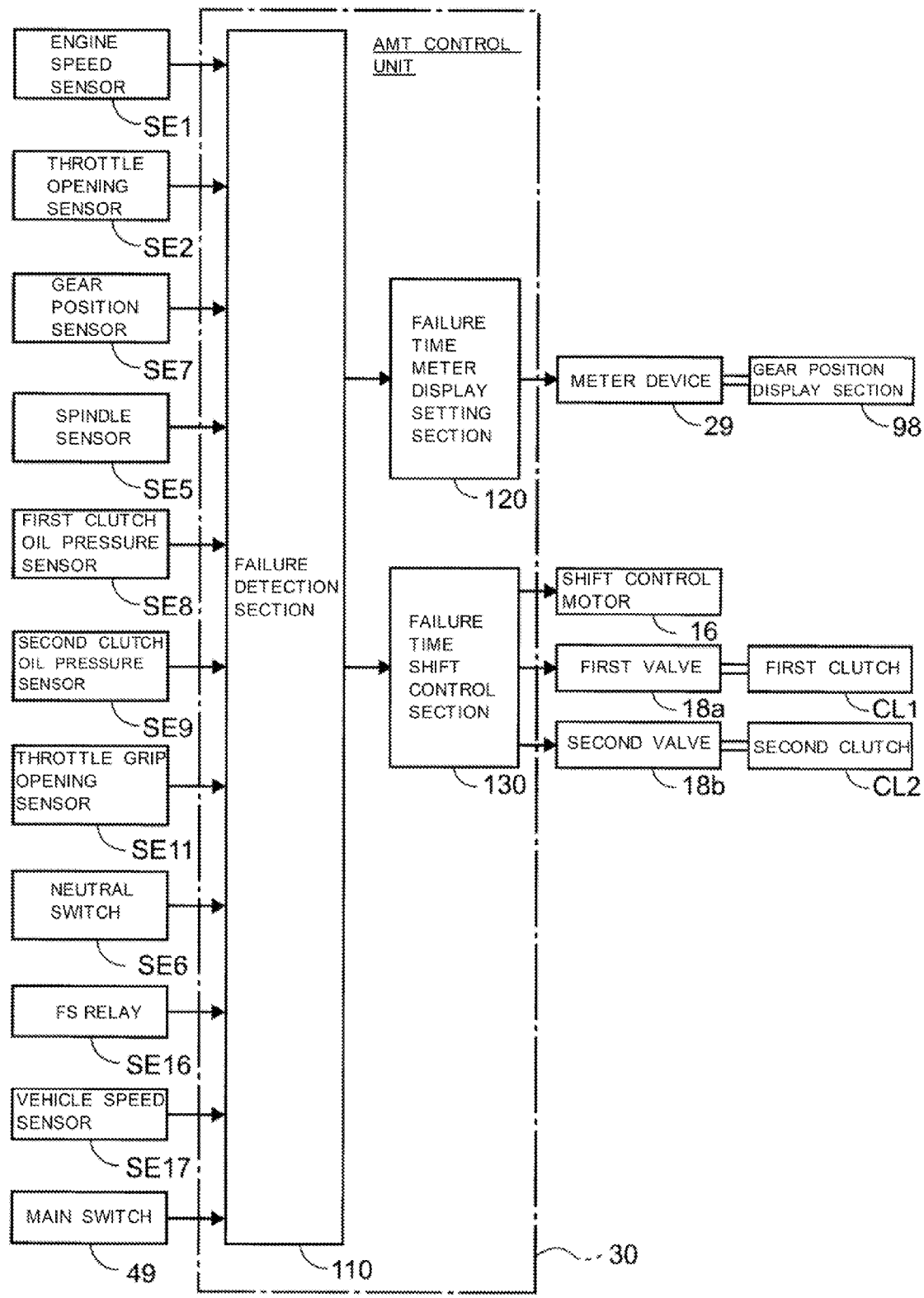
FIG. 6 is a block diagram showing the construction of an AMT control unit.

FIG. 6 is a block diagram showing the construction of the AMT control unit 30. In the block diagram, only the parts related with gear position display control and shift control at the time a failure occurs is shown. When the AMT 36 is working normally, the gear position display section 98 lights and displays the numerical figure (1-6) of the shift position selected at present. Also, when the AMT 36 is working normally, the shift control motor 16 and the first and second valves 18*a*, 18*b* are controlled based on the output information of a variety of sensors (engine speed sensor SE1, throttle opening sensor SE2, gear position sensor SE7, throttle grip opening sensor SE11, and the like).

In a failure detecting section 110 of the AMT control unit 30, information from a variety of sensors (engine speed sensor SE1, throttle opening sensor SE2, gear position sensor SE7, spindle sensor SE5, first clutch oil pressure sensor SE8, second clutch oil pressure sensor SE9, throttle grip opening sensor SE11, neutral switch SE6, FS relay SE16, vehicle speed sensor SE17, main switch 49) is inputted. Thus, the failure detection section 110 can detect the mechanical failure of the shifting gears, clutches and the like of the AMT 36 and a malfunction and the like of a variety of sensors and switches themselves.

Also, when a predetermined failure is detected to have occurred in the AMT 36 by the failure detecting section 110, a failure time meter display setting section 120 performs display setting for the time of a failure different from that in normal time for the gear position display section 98 of the meter device 29. Further, a failure time shift control section 130 is constructed so as to place an appropriate limitation of motion on the shift control motor 16 and the first and second valves 18*a*, 18*b*, that is the actuator for shifting, according to the kind of the failure when a predetermined failure is detected to have occurred. Concrete contents of the display at the time of a failure and the limitation on motion of the shifting actuator will be described later.

Figure 7:
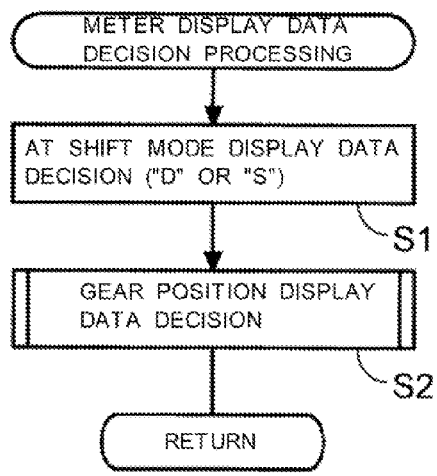
FIG. 7 is a flowchart showing the procedure for a meter display data decision processing.

FIG. 7 is a flowchart showing the procedure for a meter display data decision processing. In step S1, AT shift mode display data is decided. More specifically, in the automatic traveling mode, when the ordinary automatic traveling mode (D mode) has been selected, "D" of the traveling mode display section 99 is displayed, whereas when the sports traveling mode (S mode) has been selected, "S" is displayed. Next, in step S2, the gear position display data, that is the content displayed in the gear position display section 98, is decided and a series of control is finished.

Figure 8:
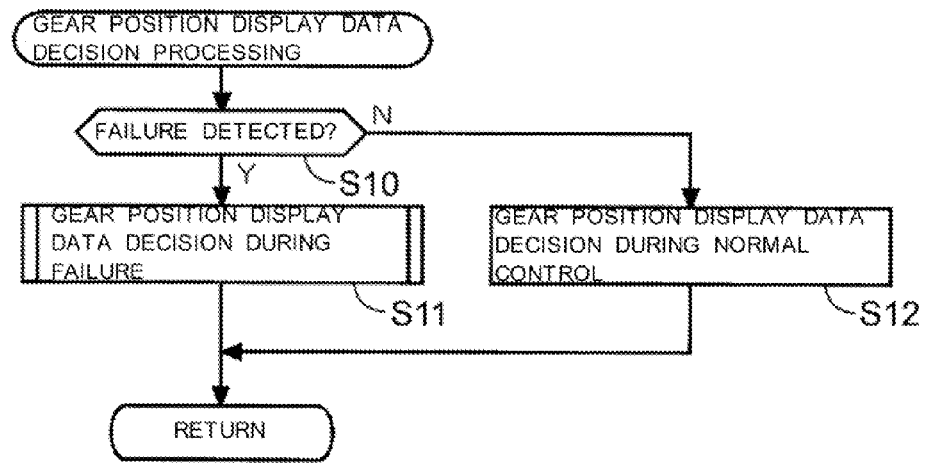
FIG. 8 is a flowchart showing the procedure for a gear position display data decision processing.

FIG. 8 is a flowchart showing the procedure for a gear position display data decision processing shown in step S2 of FIG. 7. In step S10, whether the failure state of the AMT 36 has been detected or not is determined. If determination in step S10 results in affirmative, control proceeds to step S11, and the gear position display data for the time of a failure displayed in the gear position display section 98 by the failure time meter display setting section 120 is determined.

Also, if determination in step S10 results in negative, control proceeds to S12, the gear position display data at the time of normal control is decided, and a series of control is finished. Also, as described above, the gear position display data decided in step S12 is any of the numerical figures 1-6 corresponding to the present shift position detected by the gear position sensor SE7.

Figure 9:
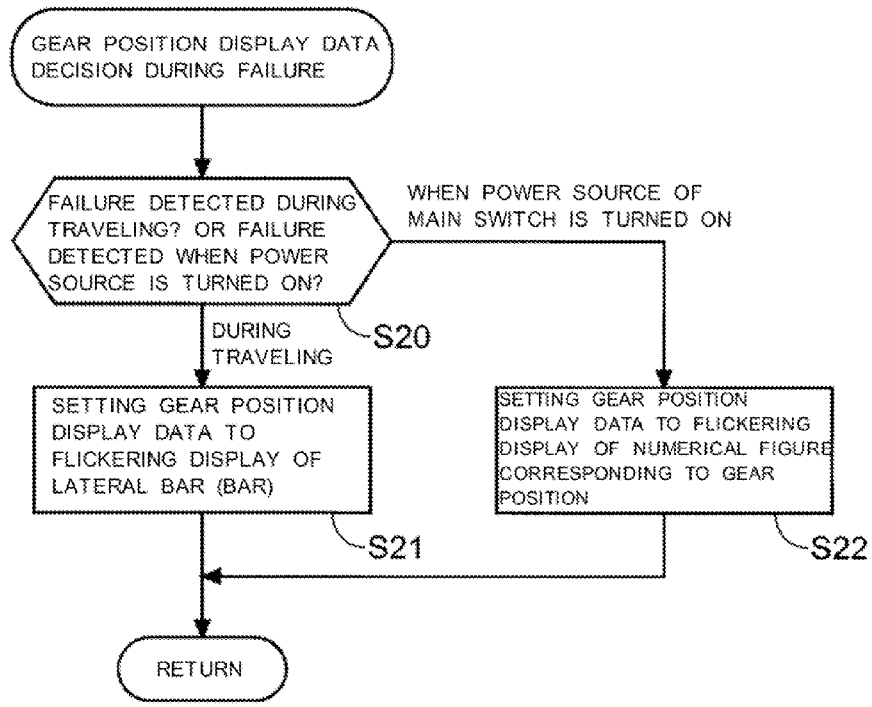
FIG. 9 is a flowchart showing the procedure for a gear position display data decision processing at the time of a failure.

FIG. 9 is a flowchart showing the procedure for a gear position display data decision processing at the time of a failure shown in step S11 of FIG. 8. In step S20, whether the failure of the AMT 36 was detected during traveling or was detected when the power source was turned on accompanying operation of the main switch 49 is determined. If the failure of the AMT 36 is determined to have been detected during traveling is step S20, control proceeds to S21, the gear position display data is set to flickering display of the lateral bar as the display for failure occurrence notification, and a series of control is finished.

On the other hand, if the failure of the AMT 36 is determined to have been detected when the power source was turned on in step S20, control proceeds to step S22, the gear position display data is set to flickering display of the numerical figure corresponding to the gear position as the shift position display at the time of a failure, and a series of control is finished.

Figure 10:
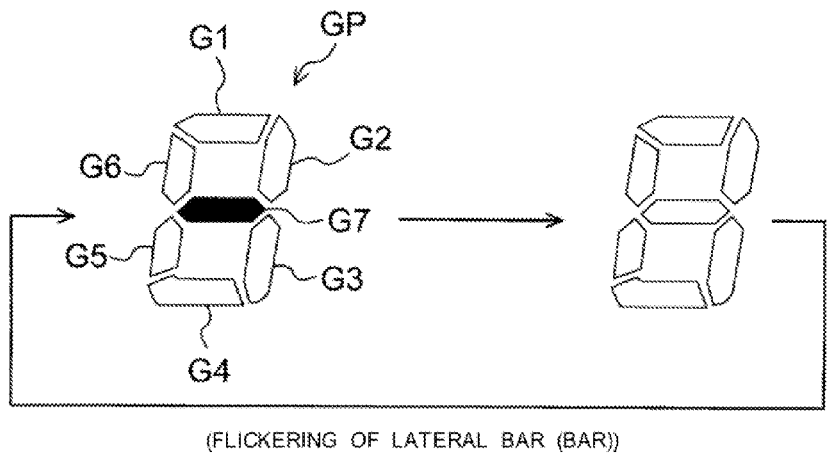
FIG. 10 is an example of the displayed contents of a gear position display section at the time of occurrence of a failure (flickering of a lateral bar).

Displayed contents of the gear position display section at the time of occurrence of a failure will be described referring to FIG. 10 to FIG. 12. The displayed contents for the time of a failure displayed in the gear position display section 98 will be described. The gear position display section 98 is constructed of a 7-segment display GP formed of the 1st segment G1 to 7th segment G7. FIG. 10 is a display state making flickering of the lateral bar (bar) visible by making the 7th segment only flicker accompanying detection of the failure of the AMT 36. As shown in step S21 of FIG. 9, this display is executed when a failure has been detected during traveling, and therefore the occupant can recognize occurrence of the failure quickly because the gear position display in normal time is switched to flickering display of the lateral bar.

Figure 11:
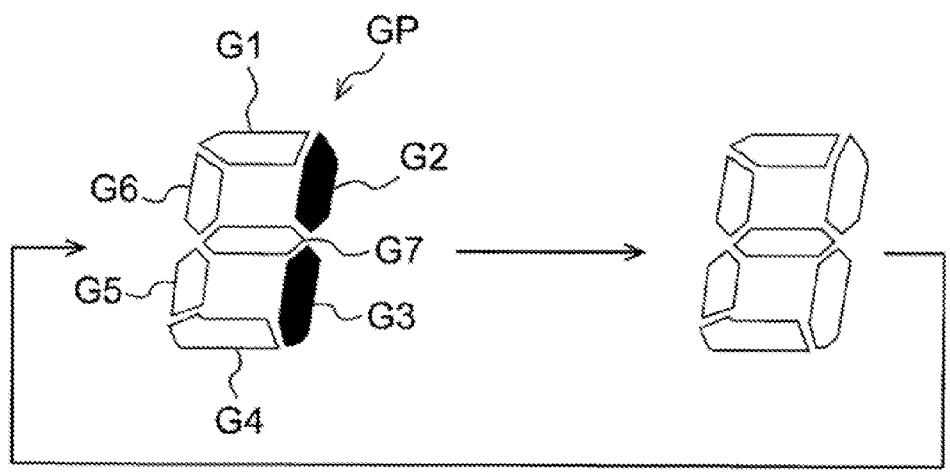
FIG. 11 is an example of the displayed contents of a gear position display section at the time of occurrence of a failure (flickering of a numerical figure "1").
Figure 12:
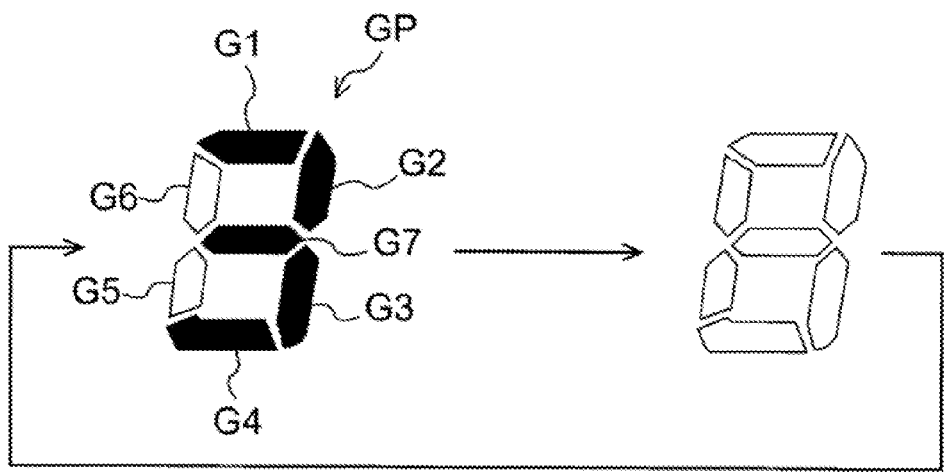
FIG. 12 is an example of the displayed contents of a gear position display section at the time of occurrence of a failure (flickering of the numerical figure "3").

Also, FIG. 11 is a display state making flickering of the numerical figure "1" visible by making the 2nd segment G2 and the 3rd segment G3 flicker accompanying detection of the failure of the AMT 36 (corresponding to step S21 of FIG. 9). Further, FIG. 12 is a display state making flickering of the numerical figure "3" visible by making the 1st-4th segments G1-G4 and the 7th segment G7 flicker. As shown in step 22 of FIG. 9, flickering display of such numerical figures is executed if a failure is detected when the power source is turned on, and notifies the occupant of the event that "although some failure has occurred in the AMT, traveling with the gear displayed by flickering is possible".

According to such display method as described above, first, when a failure occurs during traveling, it is possible to switch the gear position display to display by the lateral bar (bar) and to make the occupant quickly recognize occurrence of the failure. Also, when the occupant stops the vehicle, turns off the main switch (power source OFF), and turns on the main switch (power source ON) again, the display is switched to flickering display of the shift position numerical figure presuming that the occupant has already recognized the occurrence of the failure, and the event that traveling is possible although some failure has occurred in the AMT 36 can be recognized. Thus the occupant can run the vehicle to own house or to a dealer while recognizing necessity of inspection and repairs.

Figure 13:
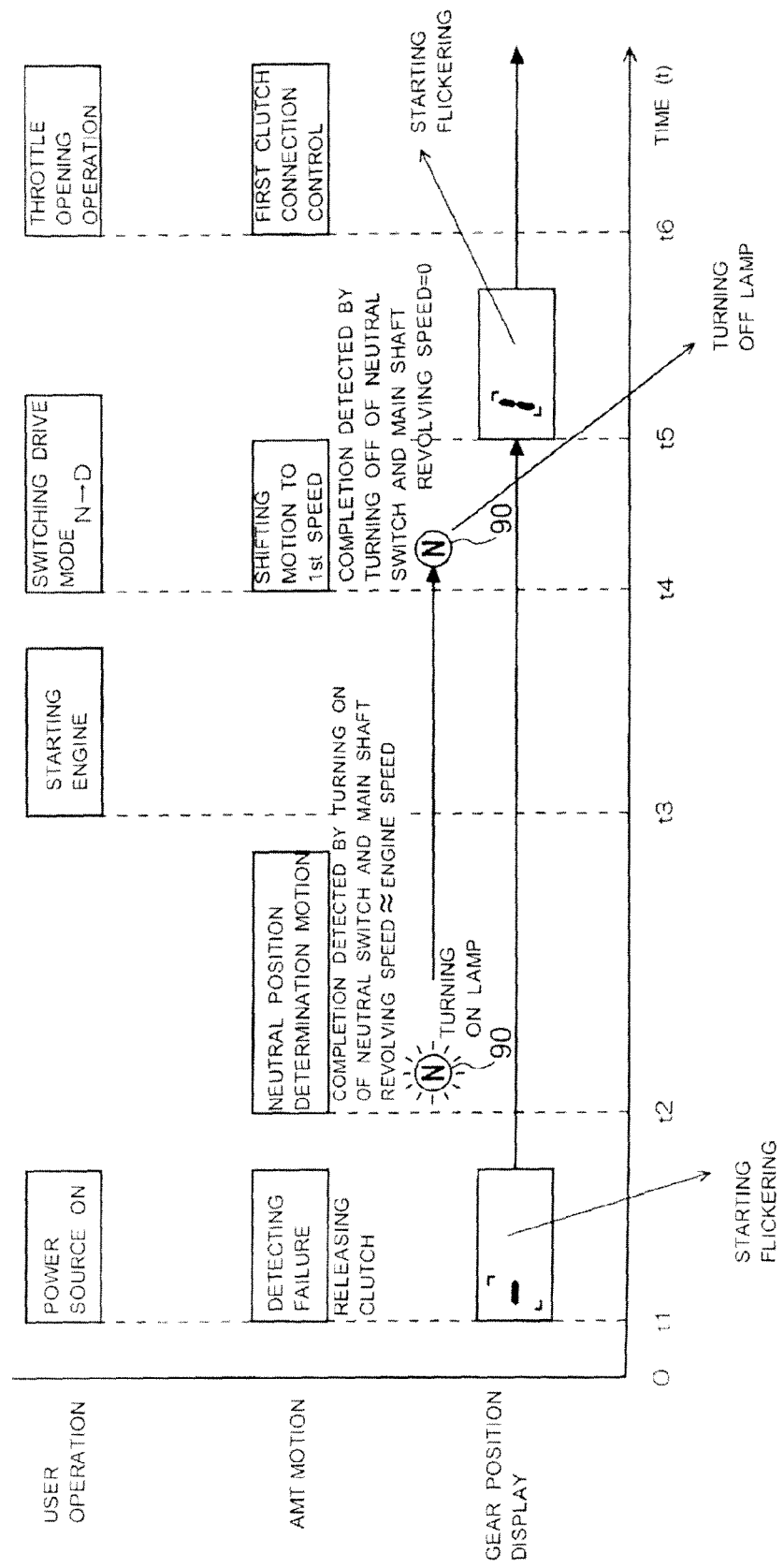
FIG. 13 is a time chart showing the flow of the gear position display control at the time of occurrence of a failure.

FIG. 13 is a time chart showing the flow of the gear position display control at the time of occurrence of a failure. In the time chart, the operation of a user (occupant), the motion of the AMT 36, the displayed contents of the gear position display section 98 are respectively shown in an order from the top.

The time chart corresponds to the flow of the case the main switch 49 is switched to ON in a state in which normal detection of the gear position is impossible due to malfunction of the gear position sensor SE7 (refer to FIG. 1). The AMT control unit 30 in relation with the present embodiment is set to allow traveling while being fixed to the 1st speed gear based on the output signal of the neutral switch SE6 and the engine speed sensor SE1 even if a failure of the gear position sensor SE7 occurs.

At the time t1, the main switch 49 is operated by the user, the power source of the vehicle is turned on, and the initial processing by the AMT control unit 30 is started. Accompanying it, when the failure detection section 110 (refer to FIG. 9) detects a failure of the gear position sensor SE7, the failure time meter display setting section 120 makes the display data of the gear position display section 98 flicker by the lateral bar (bar). Also, it is set so that the semi-automatic traveling mode switching the shift position by the shift switch cannot be selected when some failure is detected in the AMT 36.

Next, at the time t2, the AMT control unit 30 starts "neutral position determination motion" for the shift drum 11. At the time of normal control, the neutral position determination motion is determined to have been completed by the event that the gear position sensor SE7 detecting the turning position of the shift drum 11 detects the neutral position and the neutral switch SE6 is turned on. On the other hand, when a failure has occurred in the gear position sensor SE7, the neutral position determination motion is determined to have been completed by the event that the neutral switch SE6 is turned on and the main shaft revolving speed is detected to have become equal with the engine speed.

Here, the reason why the event the main shaft revolving speed becomes equal with the engine speed (revolving speed of the crankshaft) can be used as a determination criterion for the neutral position will be described. For the purpose of hitting sound suppression of the shifting gear, the AMT 36 in relation with the embodiment is constructed so as to constantly supply minimal oil pressure to the clutch in such degree not to deform the return spring even when the clutch is in a disconnected state. Thus, a minimal friction force is generated in the clutch, and the main shaft 4 (the inner shaft 4a or the outer shaft 4b) of the transmission is going to start to rotate together with the crankshaft 2. At this time, when the shift drum 11 is in the neutral position, the main shaft 4 rotates together with the crankshaft 2 and the revolving speed of the both becomes generally equal, however, when the shift drum 11 is not in the neutral position, the main shaft 4 in a power transmitting state cannot rotate. Thus, when the main shaft 4 is rotating together, the shift drum 11 can be determined to be in the neutral position, and on the contrary, when the main shaft 4 is in a halt, the shift drum 11 can be determined not to be in the neutral position.

Next, at the time t3, the engine is started by operation of the user, and at the time t4, shifting from N (neutral) to D (drive) takes place by operation of a neutral/drive changeover switch 35. Accompanying this, the AMT 36 starts "shifting motion to the 1st speed" in which the shift drum is turned to the 1st speed gear position.

At the time of normal control, the shifting motion to the 1st speed is determined to have been completed by the event that the neutral switch SE6 is turned off and the gear position sensor SE7 detects the 1st speed position. On the other hand, when a failure occurs in the gear position sensor SE7, the shifting motion to the 1st speed is determined to have been completed if the neutral switch SE6 is turned off and the main shaft revolving speed is detected to be zero. The reason is that the presumption that the 1st speed gear has been selected is possible because the neutral switch SE6 was turned off by turning the shift drum 11 from the neutral position by a predetermined angle. Also, the neutral lamp 90 is lit accompanying the neutral position determination motion, and is turned off accompanying the shifting motion to the 1st speed.

At the time t5, when the shifting motion to the 1st speed is completed, the failure time display setting section 120 switches the display of the gear position display section 98 to flickering of "1". Thus, the event that traveling with the 1st speed gear is possible although some failure has occurred in the AMT 36 can be recognized by the occupant. Also, in the example described above, because detection of the shift position by the gear position sensor SE7 is impossible, the AMT 36 receives the shift limitation of fixing to the 1st speed.

Also, when the occupant performs opening motion on the throttle at the time t6, the AMT 36 starts the connection control of the first clutch CL1, and traveling at the 1st speed gear comes to be started. Further, the flickering display of "1" in the gear position display section 98 is continued until the vehicle is stopped and the drive mode is switched to N or until the main switch is turned off.

Next, the failures possibly occurring in the AMT 36 and the examples of countermeasures against them will be described. First, as was described using FIG. 13, with respect to "wire breakage/short circuit of the gear position sensor", traveling while fixing to the 1st speed is made possible by using the engine speed sensor SE2 and the main shaft revolving speed sensors SE3, SE4 instead of the gear position sensor SE7.

Also, "wire breakage/short circuit of the line oil pressure sensor" corresponds to the case in which detection of the oil pressure of the pipe line 19 (refer to FIG. 1) by the line oil pressure sensor 14 becomes impossible, and in this case, normal traveling is made possible by substitution with the output signal of the first clutch oil pressure sensor SE8 and the second clutch oil pressure sensor SE9. In this case, although the transmission automatically shifts among the 1st-6th speed or among the 1st-4th speed, the gear position display always becomes the flickering numerical figure.

"Turning off abnormality of the neutral switch" corresponds to the state in which OFF state of the neutral switch SE6 is continued (not switched to ON state) even if the shift drum 11 is turned to a position corresponding to the neutral position. In this case, the neutral lamp 90 is not lit in spite of actually being in the neutral position. Because no problem will occur in particular in traveling in this case similarly to the failure of a bulb of the neutral lamp 90, ordinary traveling is made possible with flickering display of the numerical figure.

"Wire breakage/short circuit of the first clutch oil pressure sensor" corresponds to the case in which detection of the oil pressure of the first clutch CL1 by the first clutch oil pressure sensor SE8 becomes impossible, and in this case, only the traveling with the 2nd speed or 4th speed gear supported by the second clutch CL2 is made possible because the first clutch CL1 becomes uncontrollable. Also, "wire breakage/short circuit of the second clutch oil pressure sensor" of No. 9 corresponds to the case in which detection of the oil pressure of the second clutch CL2 by the second clutch oil pressure sensor SE9 becomes impossible, and in this case, only the traveling with the 1st speed or 3rd speed gear supported by the first clutch CL1 is made possible because the second clutch CL2 becomes uncontrollable. Also, in the present embodiment, it is set so that the traveling while fixing to the 5th and 6th speed high speed gear in which the load of the clutch in starting becomes excessively large is not performed even when either clutch becomes impossible to drive.

"Abnormality of the motor driver" represents the case in which some failure occurs in the motor driver of the shift control motor 16, and for example, the shift control motor 16 cannot perform turning motion. In this case, only when the 1st-4th speed gear is in use, traveling while fixing to the gear then is made possible.

"Wire breakage/short circuit of the spindle sensor" corresponds to the case in which the rotational angle of the spindle 15 (refer to FIG. 1) cannot be detected by the spindle sensor SE5. In this case, because whether the shift control motor 16 is normally performing the shifting motion or not cannot be determined, only traveling while fixing to the 1st speed is made possible.

"Spindle signal not given while the shifter is driven" corresponds to the case in which the turning signal of the spindle 15 (refer to FIG. 1) is not detected from the spindle sensor SE5 even if the shift drum 11 is actually turning. In this case, only traveling while fixing to the 1st speed is made possible because a mechanical failure has possibly occurred in the shifter.

"Spindle signal given while the shifter stops" represents the case in which the turning signal of the spindle 15 is detected from the spindle sensor SE5 even if the shift drum 11 is not turning. In this case also, only traveling while fixing to the 1st speed is made possible because a mechanical failure has possibly occurred in the shifter.

"Drop of the power source voltage of the shift motor" corresponds to the case in which the power source voltage of the shift motor 16 drops and the shift motor 16 cannot perform the turning motion. In this case, only when the 1st-4th speed gear is in use, traveling while fixing to the gear then is made possible. Also, there are traveling impossible states such as oil pressure abnormality of the clutch oil pressure sensors (SE8, 9) and ON abnormality of the neutral switch.

As described above, according to the shift position display device in relation with the present invention, if a failure of the AMT 36 is detected while power supply of a vehicle is turned on, the display of the gear position display section 98 formed of 7-segment display is switched from lighting display of a numerical figure showing the gear position at present to flickering display of the lateral bar, and therefore, when a failure occurs during traveling, it becomes possible to make an occupant quickly recognize that the failure has occurred. Also, if the failure is detected when the main switch 49 is switched to ON, whether the failure is a failure in which traveling is possible or a failure in which traveling is possible when a predetermined limitation is placed on shifting motion of the AMT 36 is determined. If the failure is determined to be the failure in which traveling is possible when the predetermined limitation is placed on shifting motion, the display is switched from the flickering display of the lateral bar to the flickering display of the shift position number, and therefore it becomes possible to make the occupant recognize that traveling is possible under a limited condition although some failure has occurred. Thus, both of quick recognition of a failure during traveling and easiness of recognition of the vehicle condition thereafter can be ensured compatibly with the use of one 7-segment display.

The construction of the meter device, the construction of the gear position display section, flickering interval of the display of the gear position display section when a failure has occurred, kind of the failure to be detected, limitation setting of the traveling condition against the failure, and the like are not limited to the embodiments described above and a variety of alterations are possible. For example, the display of the gear position display section when a failure has occurred during raveling may be flickering display of three lateral bars. Also, the gear position display section may be an LED display and a variety of liquid crystal displays (LCD) other than the 7-segment display. The shift position display device in relation with the present invention can be applied to a variety of vehicles such as 3-wheeled/4-wheeled vehicles not limiting to a motorcycle.

REFERENCE SIGNS LIST

1 ... Engine (power source)
4 ... Main shaft
4a ... Inner main shaft
4b ... Outer main shaft
5 ... Counter shaft
11 ... Shift drum
16 ... Shift control motor
18 ... Valve
18a ... First valve
18b ... Second valve
29 ... Meter device
30 ... AMT control unit (control section)
36 ... AMT (automated manual transmission)
42 ... Tachometer
43 ... Left side liquid crystal panel
44 ... Right side liquid crystal panel
49 ... Main switch
95 ... Speed meter
98 ... Gear position display section (shift position display device)
110 ... Failure detection section
120 ... Failure time meter display setting section
130 ... Failure time shift control section
M1-M6 ... 1st-6th speed driving gear
C1-C6 ... 1st-6th speed driven gear
CL1 ... First clutch
CL2 ... Second clutch
SE1 ... Engine speed sensor
SE2 ... Throttle opening sensor
SE5 ... Spindle sensor
SE6 ... Neutral switch
SE7 ... Gear position sensor
SE8 ... First clutch oil pressure sensor
SE9 ... Second clutch oil pressure sensor
SE14 ... Line oil pressure sensor

We claim:

1. A shift position display device, said device comprising:
a control section configured to automatically shift a shift position by operating an actuator based on a shift change command;
a gear position display section configured to display a condition of an automatic transmission based on a display command of the control section; and
a failure detection unit configured to detect a failure of the automatic transmission, wherein the control section is further configured to switch display of the gear position display section from lighting display of a numerical figure showing the shift position selected at present to a display for failure occurrence notification if the failure of the automatic transmission is detected while power supply of a vehicle is turned on, and wherein the control section is configured to determine whether the failure is a first failure type in which traveling is possible or a second failure type in which traveling is possible when a predetermined limitation is placed on shifting operation of the automatic transmission if the failure is detected when the power supply of the vehicle is switched from OFF to ON, and to switch from the display for failure occurrence notification to a shift position display for the time of a failure if the failure is determined to be the second failure type in which traveling is possible when the predetermined limitation is placed on the shifting operation.

2. The shift position display device according to claim 1, wherein the display for failure occurrence notification is a bar flickering display making one lateral bar flicker; and the shift position display for the time of a failure is flickering display of the numerical figure showing the shift position selected at present.

3. The shift position display device according to claim 1, wherein the failure detection unit is further configured to detect a failure of a gear position sensor detecting the shift position selected at present, and wherein
the control section is further configured to determine that a shift drum is turned to a neutral position if the shift drum is detected to be in a predetermined neutral position by a neutral switch and a main shaft is determined to be rotated together with a crankshaft by output of an engine speed sensor and a main shaft revolving speed sensor, and to permit traveling with a predetermined limitation being placed on the shifting operation, when the failure of the gear position sensor is detected.

4. The shift position display device according to claim 3, wherein the control section is configured to determine, when the failure of the gear position sensor is detected, and if the shift drum is detected not to be in the predetermined neutral position by the neutral switch and the main shaft is determined to be stopped based on output of the main shaft revolving speed sensor, that the shift drum is turned to a first-speed gear position and to shift from the display for failure occurrence notification to the shift position display for the time of the failure.

5. The shift position display device according to claim 1, wherein the automatic transmission is configured to control engagement/disengagement of an oil-hydraulic clutch by passing and stopping constant oil pressure supplied from an oil-hydraulic pump by a valve;
wherein the failure detection unit is further configured to detect a failure of a line oil pressure sensor detecting the constant oil pressure supplied from the oil-hydraulic pump; and wherein the control section is further configured to permit traveling with the predetermined limitation being placed on the shifting operation by substituting sensor output of the line oil pressure sensor detecting the supply oil pressure to the oil-hydraulic clutch when a failure of the line oil pressure sensor is detected.

6. The shift position display device according to claim 1, wherein the automatic transmission comprises a twin-clutch type transmission controlling engagement/disengagement of a first clutch and a second clutch respectively by passing and stopping the constant oil pressure supplied from the oil-hydraulic pump by a first valve or a second valve;
wherein the failure detection unit is further configured to detect failures of the first clutch oil pressure sensor detecting supply oil pressure to the first clutch and the second clutch oil pressure sensor detecting supply oil pressure to the second clutch; and wherein the control section is configured to permit traveling with the second clutch only being operated when the failure of the first clutch oil pressure sensor is detected to permit traveling with the first clutch only being operated when the failure of the second clutch oil pressure sensor is detected.

7. The shift position display device according to claim 1, wherein the gear position display section comprises a 7-segment display.

8. A shift position display device, said device comprising:
controlling means for controlling and automatically shifting a shift position by operating an actuator based on a shift change command;
displaying means for displaying a condition of an automatic transmission based on a display command of the control means; and
detecting means for detecting a failure of the automatic transmission, wherein the controlling means is also for switching display of the geared position display section from lighting display of a numerical figure showing the shift position selected at present to a display for failure occurrence notification if the failure of the automatic transmission is detected while power supply of a vehicle is turned on, and wherein the controlling means is also for determining whether the failure is a first failure type in which traveling is possible or a second failure type in which traveling is possible when a predetermined limitation is placed on a shifting operation of the automatic transmission if the failure is detected when the power supply of the vehicle is switched from OFF to ON, and also for switching from the display for failure occurrence notification to a shift position display for the time of a failure if the failure is determined to be the second failure in which traveling is possible when the predetermined limitation is placed on the shifting operation.

9. The shift position display device according to claim 8, wherein the display means is for displaying the failure occurrence notification as a bar flickering display making one lateral bar flicker, and wherein the shift position display for the time of the failure is a flickering display of the numerical figure showing the shift position selected at present.

10. The shift position display device according to claim 8, wherein the failure detection means is also for detecting a failure of a gear position sensor means for detecting the shift position selected at present, and wherein the control means is also for determining that a shift drum is turned to a neutral position if the shift drum is detected to be in a predetermined neutral position by a neutral switch and a main shaft is determined to be rotated together with a crank shaft by output of an engine speed sensor and a main shaft revolving speed sensor, and to permit traveling with a predetermined limitation being placed on the shifting operation when the failure of the gear position sensor is detected.

11. A shift position display device according to claim 10, wherein the control means is for determining, when the failure of the gear position sensor means is detected, and if the shift drum is detected not to be in the predetermined neutral position by the neutral switch, and the main shaft is determined to be stopped based on output of the main shaft revolving speed sensor, that the shift drum is turned to a first-speed-gear position and for shifting from the display for failure occurrence notification to the shift position display for the time of the failure.

12. The shift position display device according to claim 8, wherein the automatic transmission is configured to control engagement/disengagement of an oil-hydraulic clutch by passing and stopping constant oil pressure supply from an oil-hydraulic pump by a valve,
wherein the failure detection means is also for detecting a failure of a line oil pressure sensor detecting the constant oil pressure supply from the oil-hydraulic pump,
and wherein the control means is also for permitting traveling with the predetermined limitation being placed on the shifting operation by substituting sensor output of the clutch oil pressure sensor detecting the supply oil pressure to the oil-hydraulic clutch when a failure of the line oil pressure sensor is detected.

13. The shift position display device according to claim 8, wherein the failure detection means is also for detecting failures of a first clutch oil pressure sensor detecting supply oil pressure to a first clutch of the automatic transmission and a second clutch oil pressure sensor detecting supply oil pressure to a second clutch of the automatic transmission, and wherein the control means is for permitting traveling with the second clutch only being operated when the failure of the first clutch oil pressure sensor is detected, to permit traveling with the first clutch only being operated when the failure of the second clutch oil pressure sensor is detected.

14. A method of indicating transmission status in a vehicle, said method comprising:
automatically shifting a shift position by operating an actuator based on a shift change command;
displaying a condition of an automatic transmission on a gear position display section based on a display command;
detecting a failure of the automatic transmission;
switching display of the condition of the automatic transmission from a lighting display of a numerical figure showing a shift position selected at present to a display for failure occurrence notification if the failure of the automatic transmission is detected while power supply of the vehicle is turned on;
determining whether the failure is a first failure type in which traveling is possible or a second failure type in which traveling is possible when a predetermined limitation is placed on shifting operation of the automatic transmission if the failure is detected when the power supply of the vehicle is switched from OFF to ON; and
switching from the display for failure occurrence notification to a shift position display for the time of a failure if the failure is determined to be the second failure type in which traveling is possible when the predetermined limitation is placed on the shifting operation.

15. The method according to claim 14, wherein the display for failure occurrence notification is a bar flickering display making one lateral bar flicker, and wherein the display for the time of a failure is a flickering display of the numerical figure showing the shift position selected at present.

16. The method according to claim 14, further comprising detecting a failure of a gear position sensor detecting a shift position selected at present;
determining that a shift drum is turned to a neutral position if the shift drum is detected to be in a predetermined neutral position by a neutral switch;
determining that a main shaft is rotated together with a crank shaft by an output of an engine speed sensor and a main shaft revolving speed sensor; and
permitting traveling with a predetermined limitation being closed on the shifting operation when the failure of the gear position sensor is detected.

* * * * *